US012734775B2

(12) United States Patent
Pontone et al.

(10) Patent No.: US 12,734,775 B2
(45) Date of Patent: Sep. 15, 2026

(54) METHOD AND APPARATUS FOR THE APPLICATION OF A HIGHLY VISCOUS FLUID

(71) Applicant: Bridgestone Europe NV/SA [BE/BE], Zaventem (BE)

(72) Inventors: Roberto Pontone, Rome (IT); Paolo Straffi, Rome (IT)

(73) Assignee: Bridgestone Europe, NV/SA, Zaventem (BE)

( * ) Notice: Subject to any disclaimer, the term of this patent is extended or adjusted under 35 U.S.C. 154(b) by 207 days.

(21) Appl. No.: 18/698,927

(22) PCT Filed: Oct. 7, 2022

(86) PCT No.: PCT/IB2022/059591
§ 371 (c)(1),
(2) Date: Apr. 5, 2024

(87) PCT Pub. No.: WO2023/057969
PCT Pub. Date: Apr. 13, 2023

(65) Prior Publication Data

US 2024/0408836 A1 Dec. 12, 2024

(30) Foreign Application Priority Data

Oct. 7, 2021 (IT) ........................ 102021000025682

(51) Int. Cl.
*B29D 30/06* (2006.01)
*B05C 5/02* (2006.01)

(52) U.S. Cl.
CPC ........ *B29D 30/0685* (2013.01); *B05C 5/0216* (2013.01); *B29D 2030/0697* (2013.01)

(58) Field of Classification Search
USPC ................................ 118/306, 317, 712, 672
See application file for complete search history.

(56) References Cited

U.S. PATENT DOCUMENTS 12,552,119 B2 * 2/2026 Pontone ............ B29D 30/0685
2019/0061295 A1 * 2/2019 Ooshima .............. B29C 73/166
(Continued)

FOREIGN PATENT DOCUMENTS

CA 2198292 A1 * 8/1997 .......... B05B 5/1625
EP 3415303 A1 12/2018
(Continued)

OTHER PUBLICATIONS

English Translation JP-2005036890A (Year: 2005).*

*Primary Examiner* — Yewebdar T Tadesse
(74) *Attorney, Agent, or Firm* — Patterson Intellectual Property Law, PC

(57) ABSTRACT

A method and a system for applying a highly viscous fluid to an inner surface of a cavity of a tire, comprising an applicator device for the highly viscous fluid and a delivery circuit for the highly viscous fluid connected to the applicator device and having a highly viscous fluid collection device comprising a tank that internally defines a collection chamber; a delivery device for the highly viscous fluid implemented by means of a pumping device that delivers the highly viscous fluid to the applicator device; a movable piston that delimits the collection chamber at the perimeter; an extractor element intended to move with an alternating movement so as to draw the first highly viscous fluid inside the collection chamber and deliver it to the pumping device; and a position sensor, in particular a linear position transducer, suitable for detecting the position of the piston.

13 Claims, 3 Drawing Sheets

(56) References Cited

U.S. PATENT DOCUMENTS

| | | | | |
|---|---|---|---|---|
| 2019/0168470 | A1 * | 6/2019 | Paasch | B60S 5/046 |
| 2019/0193105 | A1 * | 6/2019 | Pringle-Iv | B05C 11/1015 |

FOREIGN PATENT DOCUMENTS

| | | | | | |
|---|---|---|---|---|---|
| JP | 2005036890 | A | * | 2/2005 | |
| JP | 2006117193 | A | | 5/2006 | |
| WO | WO-2020154242 | A1 | * | 7/2020 | B05C 11/1034 |

* cited by examiner

9
ECU
34* 33* 18* 17* 23* 22* 32* 30* 31* 21* 19* 20* 13* 11* 35 16* 12* 14* 15* 26* 27* 28* A* C* 24* 25* 29*
34 33 18 17 23 22 32 30 31 21 19 20 13 11 35 16 12 14 15 26 27 28 A C 24 25 29

METHOD AND APPARATUS FOR THE APPLICATION OF A HIGHLY VISCOUS FLUID

TECHNICAL SECTOR

The present invention relates to a method and apparatus for the application of a highly viscous fluid.

PRIOR ART

As is known, a tire comprises a toroidal carcass, which has two annular beads and supports an annular tread. Between the carcass and the tread, a tread belt is interposed, which comprises a number of tread plies. Within the carcass ply, an innerliner is arranged which is airtight, constitutes an inner lining and has the function of retaining the air within the tire in order to maintain the inflation pressure of the tire itself over time.

In recent years, tire development has been directed towards tires with an inner lining that is manufactured with a sealing agent that is intended to seal any punctures. Typically, the sealing agent has high viscosity in order to ensure both the sealing action in relation to any holes and the stability thereof within the internal cavity regardless of the conditions of the tire.

The sealing agent is applied to a pre-vulcanized tire and preferably to the innerliner within the area of the tire that comes into contact with the road (or the area of the tire in which punctures may potentially occur). In particular, the sealing agent is applied at the tread and at least partially at the sidewalls.

Typically, the process for applying the sealing agent provides for the positioning of the pre-vulcanized tire on a frame, whereupon it is blocked by means of lateral rails in such a way as to prevent any lateral translation of the tire itself.

In response to an operator command, the sealing agent application process is started by inserting a sealing agent applicator device into the internal cavity of the tire in a position directly facing a surface of the internal cavity itself. The applicator device is conveniently implemented by means of a movable arm provided at one end of a nozzle and is intended to apply a substantially uniform bead of sealing agent to the inner surface of the cavity. In particular, the applicator device is intended to apply a bead of sealing agent by means of a reciprocating movement between the two lateral ends of the internal cavity; in particular, the arm moves within a plane that is perpendicular to the equatorial plane of the tire. The tire is brought into rotation by the support by means of motorized rollers; and the movement of the arm and the rotation of the tire combined lead to the application of the sealing agent, which must be as uniform as possible.

The applicator device is connected to a sealing agent delivery circuit comprising a tank that is preferably manufactured from a metal material and contains the sealing agent, a conduit that is preferably heated and that originates from the tank and is in hydraulic communication with the applicator device, and a pumping device that draws the sealing agent from the tank and delivers it under pressure to the applicator device. In particular, an extractor element is provided at one end of a movable scoop intended to move with an alternating movement so as to draw the sealing agent inside the tank and feed it to the pumping device.

The extraction of the sealing agent from the tank may, however, be particularly complex due to the high viscosity thereof. In particular, when reducing the amount of sealing agent contained within the tank, the sealing agent itself may have difficulty flowing from the side wall of the tank towards the extraction point, causing phenomena similar to cavitation phenomena; in other words, an empty cavity is generated near the extractor element that leads the pumping device to work at idle with increased strokes per minute that may damage the pumping device itself in the long run.

DESCRIPTION OF THE INVENTION

The aim of the present invention is to provide a method for the application of a highly viscous fluid that is both free from the disadvantages of the prior art and that is, in particular, easy and inexpensive to implement.

A further aim of the present invention is to provide an apparatus for the application of a highly viscous fluid that is both free from the disadvantages of the prior art and that is, in particular, easy and inexpensive to implement.

According to the present invention, a method and an apparatus are provided for the application of a highly viscous fluid as set forth in the appended claims.

BRIEF DESCRIPTION OF THE DRAWINGS

The present invention is now described with reference to the attached drawings, which illustrate several non-limiting exemplary embodiments, wherein.

PREFERRED EMBODIMENTS OF THE INVENTION

Figure 1:
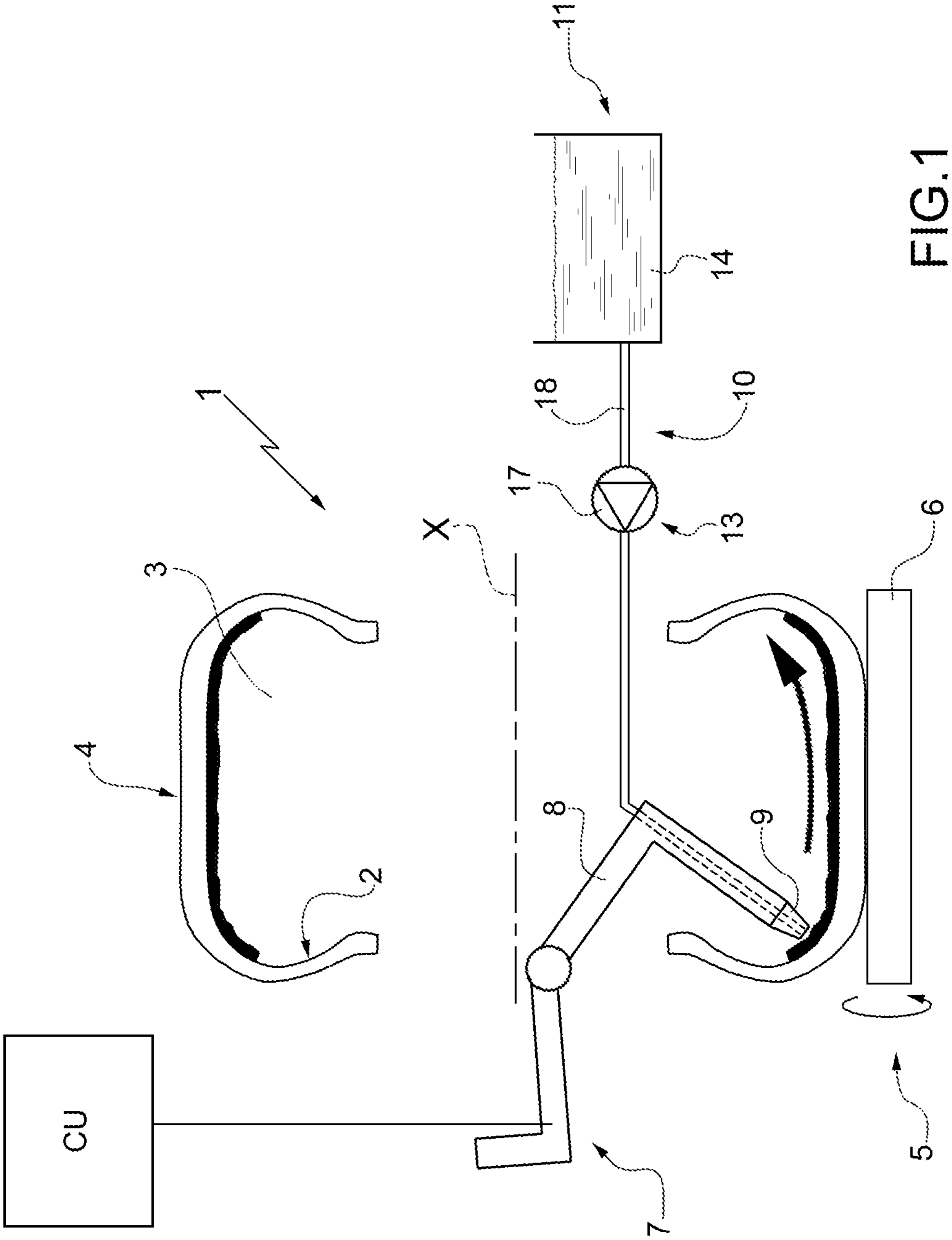
FIG. 1 is a front schematic view, with parts removed for clarity, of a system that has been implemented for the application of a sealing agent to the surface of the internal cavity of a tire.

With reference to FIG. 1, the numeral 1 denotes a system 1 in its entirety configured for the application of a sealing agent to the surface 2 of the inner cavity 3 of a tire 4. It is to be understood that the phrase "profile of the inner cavity 3 of a tire 4," refers to a surface profile of the tire 4.

The tire 4 is arranged on a frame 5 that is suitable for supporting, and bringing into rotation about the central x axis thereof, the tire 4 by means of motorized rollers 6. The system 1 comprises a sealing agent applicator device 7 conveniently implemented by means of a robot provided with a movable arm 8 and intended to apply a substantially uniform bead of sealing agent to the surface 2 at the portion of the tire 3 that is intended to come into contact with the road, i.e., at the tread and, at least partially, at the sidewalls. According to a preferred variant, in order to perform the non-contact application of the sealing agent in the semifluid state, the applicator device 7 is implemented by means of a nozzle 9; the nozzle 9 is preferably arranged at one axial end of the movable arm 8.

A sealing agent delivery circuit 10 is connected to the applicator device 7. The system 1 also comprises an electronic control unit ECU that supervises the operation of the applicator device 7 and/or the delivery circuit 10, as better described within the discussion that follows.

Figure 2:
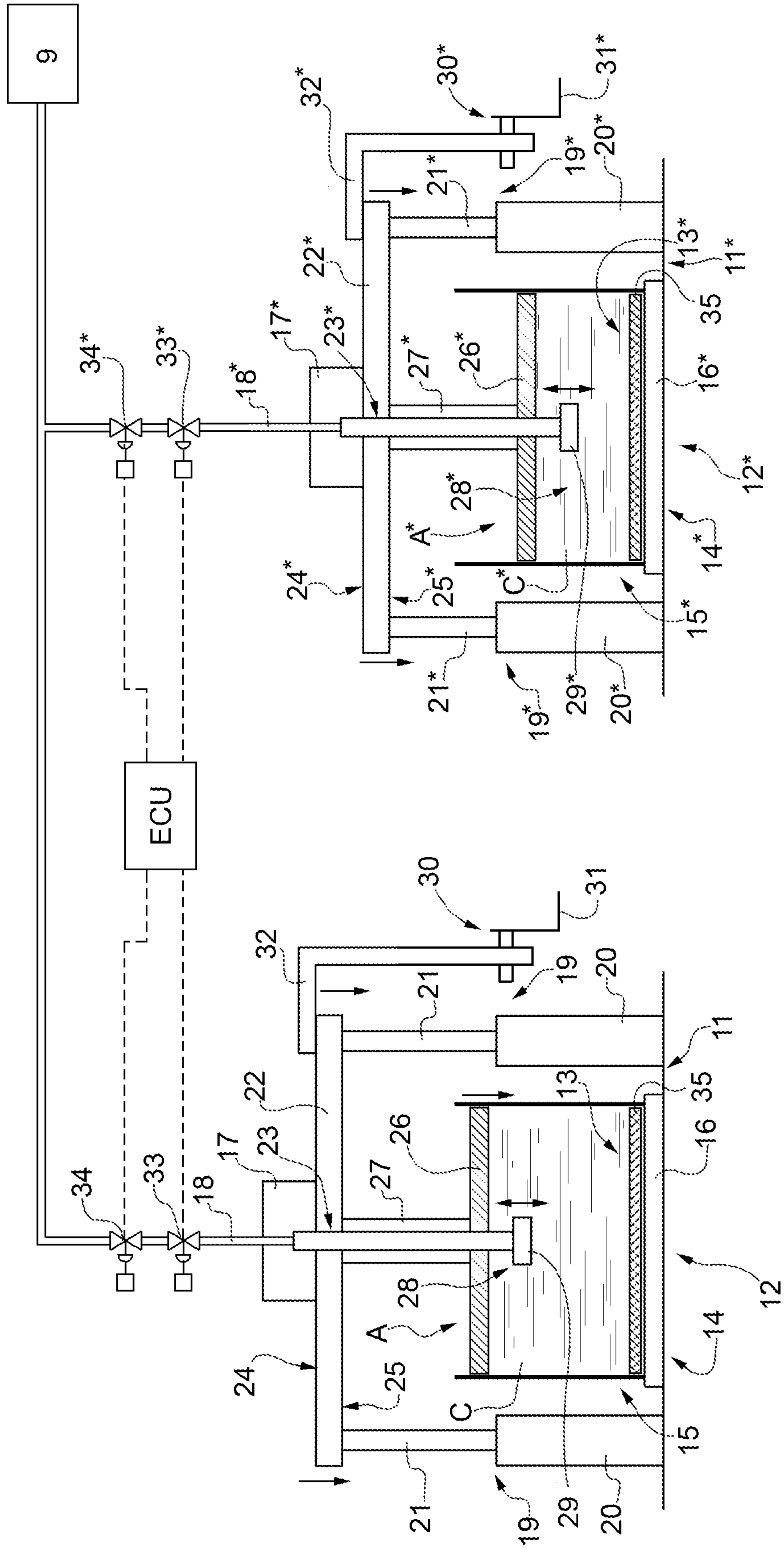
FIG. 2 is a schematic view of a portion of the system of FIG. 1 implemented in accordance with the present invention.

As illustrated in FIG. 2, the delivery circuit 10 comprises a new sealing agent collection device 11, a new sealing agent delivery device 13, a recycled sealing agent collection device 11*, and a recycled sealing agent delivery device 13*.

The assembly defined by the new sealing agent collection device 11 and the new sealing agent delivery device 13 is substantially identical to the assembly formed by the recycled sealing agent collection device 11* and the recycled sealing agent delivery device 13*; only one of said assemblies will therefore be described in the following discussion.

The sealing agent collection device 11 comprises a collection tank 14, preferably made of a metal material and in particular of steel, that collects the sealing agent therewithin.

The tank 14 is defined by a cylindrical tubular casing 15 (or drum) that is closed at the bottom by a bottom wall 16 and open at the top (i.e., it is not provided with an upper wall or lid). The tank 14 has a variable volume collection chamber C, which has a cylindrical symmetry about an axis of rotation and is laterally delimited by the casing 15.

In contrast, the sealing agent delivery device 13 comprises a pumping device 17 that is connected to the electronic control unit ECU by which it is actuated, and that is suitable for drawing the sealing agent from the tank 14 and supplying it, under pressure, to the applicator device 7 by means of a sealing agent delivery conduit 18. The sealing agent delivery conduit 18 is preferably heated, originates from the tank 14 and is in hydraulic communication with the applicator device 7. According to a preferred variant, a number of shut-off valves (not shown) that control and regulate the flow of sealing agent are also located along the delivery conduit 18, downstream of the pumping device 17.

The pumping device 17 is preferably implemented by means of an extraction pump (known per se and not described in detail), in particular of the tire type and specifically for highly viscous materials.

The sealing agent delivery device 13 then comprises a pair of extractor devices 19 arranged externally to the tank 14. In particular, the two extractor devices 19 are implemented by means of a pair of hydraulic extractor cylinders 19 arranged laterally in relation to the tank 14. The two extractor cylinders 19 are diametrically opposite in relation to the tank 14. The two extractor cylinders 19 are of a known type and are each provided with a relevant cylinder 20 comprising a hollow cylindrical body, a movable piston (not shown) that slides within the cylinder 20 due to the effect of the pressure exerted by the fluid contained within the cylinder 20 itself, and a rod 21 having a first end connected to the piston and a second, outer end connected to the cylinder 20. In particular, the rods 21 are connected at a second end to a thrust plate 22. The thrust plate 22 is provided with a through-hole 23 formed at a substantially central position. At an upper surface 24 (i.e., facing outward and not facing the collection device 11), the thrust plate 22 carries, connected at a substantially central position, the pumping device 17. At an inner surface 25 (i.e., in a position directly facing the collection device 11), the thrust plate 22 carries, connected at a substantially central position, an assembly A formed by a piston 26 that delimits at the perimeter the collection chamber C and a rod 27 connecting the piston 26 and the thrust plate 22.

In particular, the thrust plate 22 and the assembly A may move downwards (in other words towards the bottom wall 16) in such a way as to exert a substantially constant pressure against the sealing agent as the amount of sealing agent within the tank 14 varies.

In use, the thrust plate 22 and the assembly A are movable between an upper end-of-travel position (shown in FIG. 2), in which the volume of the collection chamber C is at a maximum, and a lower end-of-travel position, which substantially corresponds to the complete emptying of the tank 14, in which position the volume of the collection chamber C is at a minimum and the piston 26 is arranged substantially at the bottom wall 16.

Both the piston 26 and the rod 27 are internally hollow, i.e., they are provided with respective through holes that are arranged, when in use, facing each other and in communication with each other in such a way as to define a channel for the passage of an extractor element 28. In addition, the opening formed in the rod 27 is facing, and in communication with, the through-hole 23. The extractor element 28 is provided at one end with a movable scoop 29 intended to move with a reciprocating motion in such a way as to draw the sealing agent within the collection chamber C in the vicinity of the piston 26 and to deliver said sealing agent to the pumping device 17.

Furthermore, the delivery circuit 10 comprises a position sensor 30, in particular a linear position transducer (for example a Hall effect sensor) intended to detect the position of the piston 26. The position sensor 30 is preferably arranged externally to the tank 14 and to the pair of extractor cylinders 19. The position sensor 30 is connected to the electronic control unit ECU to which it transmits signals indicative of the position of the piston 26. In other words, the position sensor 30 is arranged at a position facing the piston 26 so as to detect the displacements thereof over a predetermined interval of time. In particular, the position sensor 30 transmits signals indicative of the position of a bracket 32 connected to the thrust plate 22 (and, consequently, to the piston 26). According to a preferred variant, the position sensor 30 is supported by a bracket 31, preferably L-shaped.

In addition, the delivery circuit 10 comprises a solenoid valve 33 connected to the electronic control unit ECU. The solenoid valve 33 is preferably of the proportional and pressure-controlled type; the solenoid valve 33 allows for precise control of the pressure exerted by the piston 26 upon the sealing agent.

Finally, the delivery circuit 10 comprises a solenoid valve 34 connected to the electronic control unit ECU. The solenoid valve 34 is preferably of the proportional type; the solenoid valve 34 makes it possible to precisely control the rate of extraction of the sealing agent from the tank 14 by controlling the rate of the reciprocating motion of the extractor element 28.

According to a preferred variant, also provided is a heating device 12 housed at the bottom wall 16 or alternatively at the piston 26 and provided with a heating element 35 intended for heating the sealing agent, preferably implemented by means of an electrical resistance connected to the electronic control unit by which it is controlled. The electrical resistance, in order to heat the sealing agent, is preferably embedded within a disc element of reduced thickness. Alternatively, the heating element is implemented by means of a conduit or a coil wherein a heating fluid circulates that is supplied by a delivery circuit.

The method implemented by the electronic control unit ECU to control the application of the sealing agent is described below.

The electronic control unit ECU acquires a plurality of input data that are processed in order to control the application of the sealing agent.

In the first instance, the electronic control unit ECU acquires the weight W of the applied sealing agent, expressed in kg, during the last application (typically, the weight of the applied sealing agent is calculated from the difference between the weight of the tire 4 detected after the application of the sealing agent, and the weight of the tire 4 detected before the application of the sealing agent).

Figure 3:
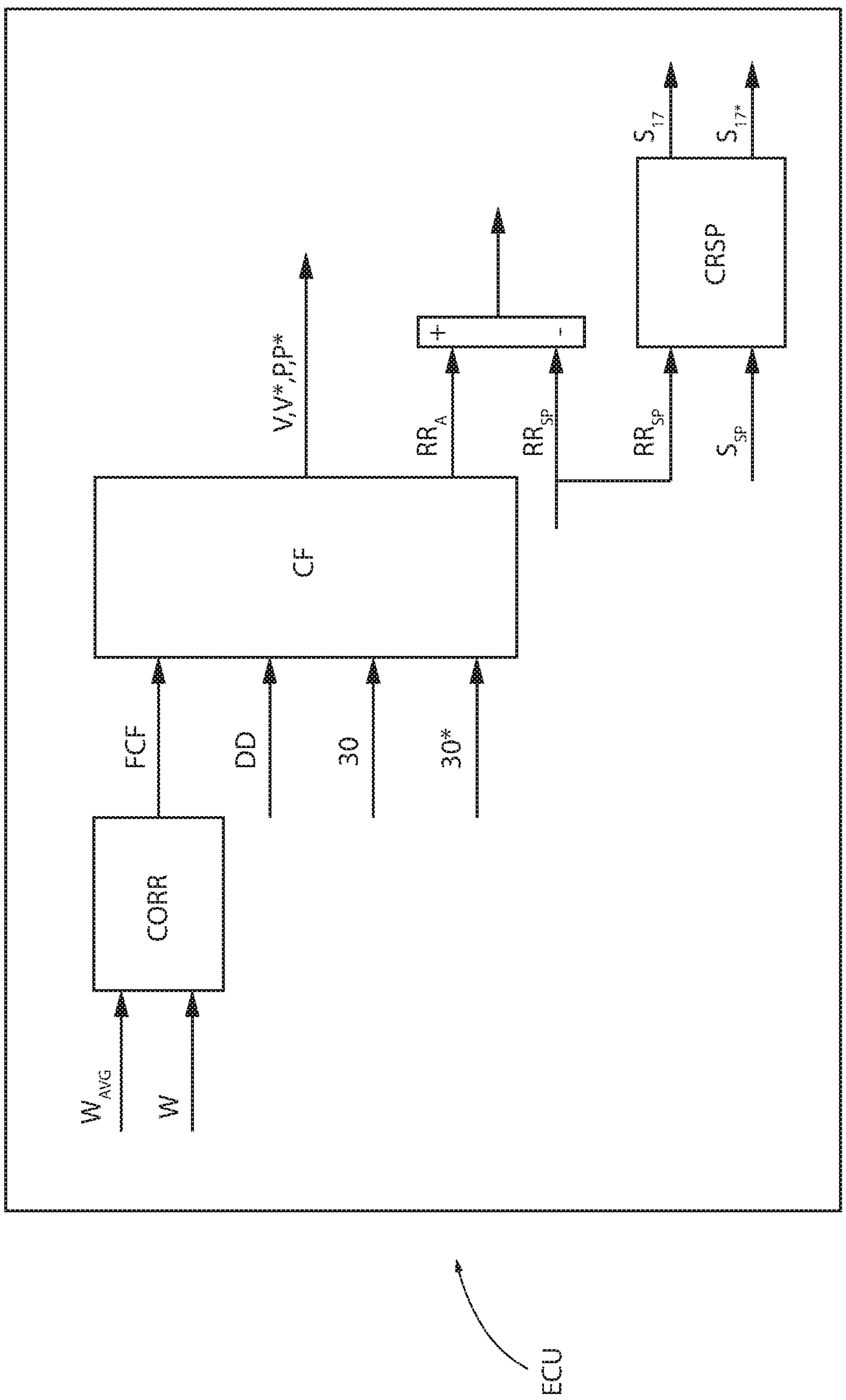
FIG. 3 is a block diagram showing a control method implemented in accordance with the present invention and implemented by an electronic control unit of FIG. 1.

The block indicated with CORR in FIG. 3 seeks to cancel out an error in the weight W of the applied sealing agent, i.e. a difference between the weight W of the applied sealing agent and the average weight $W_{AVG}$ of the applied sealing agent during the last n applications (with n being variable). Based upon the weight W of the applied sealing agent and the average weight $W_{AVG}$ of the sealing agent applied during the last n applications, a sealing agent flow correction factor FCF, expressed in pulses per minute, (pls/min) is calculated. According to a preferred variant, the number of applications n is greater than 50.

According to a preferred embodiment, said correction factor FCF is calculated from the ratio between the average weight $W_{AVG}$ of the sealing agent applied during the last n applications (with n being variable) and the theoretical (or ideal) weight wr of the sealing agent to be applied. This ratio is then further corrected by multiplying it by a gain index (in order to adjust the amount of correction).

The block indicated with CRPS in FIG. 3 instead makes it possible to calculate the target extraction rate of the pumping device 17, expressed in pulses per minute, and the target extraction rate of the pumping device 17*, expressed in pulses per minute.

In particular, the electronic control unit ECU receives as an input the target value $RR_{SP}$ of the ratio between the recycled sealing agent and new sealing agent (expressed as a percentage, where a target value of 15% indicates that it is desired to obtain 15% recycled sealing agent based upon the total and 85% new sealing agent based upon the total); and the target value $S_{SP}$ of the total sealing agent extraction rate (expressed in pulses per minute) obtained both by means of the pumping device 17 and by means of the pumping device 17* (for example, 100 pls/min).

From the product of the target value $RR_{SP}$ and target value $S_{SP}$ it is possible to determine the target extraction rate $S_{17*}$ of the pumping device 17*; while the target extraction rate $S_{17}$ of the pumping device 17* is obtained simply from the difference between the target value $S_{SP}$ of the total extraction rate and the target extraction rate $S_{17*}$ of the pumping device 17*. For example, with the data reported in the previous discussion, a target pumping device 17* extraction rate $S_{17*}$ equal to 15 pls/min and a target pumping device 17 extraction rate $S_{17}$ equal to 85 pls/min would be obtained.

Finally, the block indicated with CF in FIG. 3 receives the following parameters as input data:

- dimensions DD of the casing 15 defining the tank 14 (in particular, the inner diameter of the cylindrical tubular casing 15) expressed, for example, in mm;
- flow correction factor FCF expressed in pulses per minute (pls/min);
- position of the piston 26 provided by the position sensor 30 and preferably expressed in mm; and
- the position of the piston 26* provided by the position sensor 30* and preferably expressed in mm.

By means of these input data and knowing the geometry of the tank, the electronic control unit ECU is designed to determine:

- the effective value $RR_A$ of the ratio between new sealing agent and recycled sealing agent (expressed as a percentage, wherein an effective value of 5% indicates that the recycled sealing agent is 5% of the total sealing agent and the new sealing agent is 95% of the total sealing agent);
- the volume V, V* of sealing agent extracted from each pumping device 17, 17* during a predetermined interval of time; and
- the effective flow rate P, P* of each pumping device 17, 17* expressed in kg per minute.

In the event that the deviation between the effective value $RR_A$ of the ratio of new sealing agent to recycled sealing agent and the target value $RR_{SP}$ of the ratio between the recycled sealing agent and the new sealing agent is greater than a limit value (variable and predetermined at a preliminary set-up stage)—for example ±5%—the electronic control unit is designed to send an alarm signal.

The preceding discussion explicitly refers to a system for the application of a sealing agent to the surface 2 of the inner cavity 3 of a tire 4; however, the system and the method described may find advantageous application with any highly viscous fluid.

The preceding discussion therefore explicitly refers to a system for the application of a new sealing agent and a recycled sealing agent; the system and method described may however find advantageous application with any combination of highly viscous fluids.

The advantages of the system 1 described in the preceding discussion are evident. In particular, the system 1 makes it possible to optimize the flow of the sealing agent, and makes it possible to simplify the extraction of the sealing agent from the tank 14 and, in this way, prevent damage to the pumping device 17 and allow for the complete emptying of the tank 14.

The invention claimed is:

1. A system for applying a highly viscous fluid to an inner surface of a cavity of a tire, the system comprising:

- an applicator device configured for controlled movement relative to the inner surface of the cavity of the tire;
- a first sealing agent collection device comprising a tank defined by a first casing comprising first highly viscous fluid in a first variable volume collection chamber;
- a first pumping device configured to deliver a first highly viscous fluid to the applicator device;
- a first movable piston that delimits the first variable volume collection chamber at a perimeter thereof;
- a first extractor element configured to move with an alternating movement to draw the first highly viscous fluid inside the first variable volume collection chamber and deliver the first highly viscous fluid to the first pumping device;
- a first position sensor configured to detect a position of the first movable piston;
- a second sealing agent collection device comprising a second tank defined by a second casing comprising a second highly viscous fluid in a second variable volume collection chamber;
- a second pumping device configured to deliver the second highly viscous fluid to the applicator device;
- a second movable piston that delimits the second variable volume collection chamber at a perimeter thereof;
- a second extractor element configured to move with an alternating movement to draw the second highly viscous fluid inside the second variable volume collection chamber and deliver the first highly viscous fluid to the second pumping device; and
- a second position sensor configured to detect a position of the second movable piston.

2. The system of claim 1, wherein the first position sensor is a linear position transducer.

3. The system of claim 1, further comprising a first solenoid valve configured to control a pressure exerted by the first movable piston on the first highly viscous fluid.

4. The system of claim 1, wherein the second position sensor is a linear position transducer.

5. The system of claim 1, comprising a first solenoid valve configured to control a pressure exerted by the first movable piston on the first highly viscous fluid and/or the second movable piston on the second highly viscous fluid.

6. The system of claim 5, wherein the first solenoid valve is of a proportional pressure-controlled type.

7. The system of claim 5, comprising a second solenoid valve configured to control an extraction rate of the first highly viscous fluid from the first tank and/or the second highly viscous fluid from the second tank by controlling a rate of the alternating motion of the respective highly viscous fluid with the respective extractor.

8. The system of claim 7, wherein the second solenoid valve is of a proportional pressure-controlled type.

9. A method for applying a highly viscous fluid to an inner surface of a cavity of a tire using the system of claim 1, the method comprising:

arranging the first position sensor and the second position sensor in a position facing the respective first and/or second piston;

during each application of the first highly viscous fluid and/or the second highly viscous fluid, detecting the position of the corresponding first and/or second piston via the respective first and/or second position sensor;

determining an effective volume and flow rate of the extracted highly viscous fluid as a function of the detected position of the respective first piston and/or second piston; and adjusting the application of the highly viscous fluid according to the determined effective volume and flow rate of the extracted highly viscous fluid.

10. The method of claim 9, comprising:

determining a first target value corresponding to a ratio between the first highly viscous fluid delivered by the first pumping device and the second highly viscous fluid delivered by the second pumping device;

determining a second target value corresponding to a total extraction rate of the highly viscous fluid; and calculating a target extraction rate of the highly viscous fluid for each pumping device from the first target value and the second target value.

11. The method of claim 10, comprising:

determining an effective value of the ratio; and signalling a fault and/or a malfunction upon determining that a deviation between the effective value of the ratio and the target value of the ratio is greater than a limit value.

12. The method of claim 9, comprising:

calculating a weight of the applied first highly viscous fluid and/or second highly viscous fluid;

determining a representative value of the weight of the first highly viscous fluid and/or second highly viscous fluid applied during the last n applications;

determining a highly viscous fluid correction factor (FCF) to be applied as a function of both the weight of the first highly viscous fluid and/or second highly viscous fluid applied and the representative value of the weight of the first highly viscous fluid and/or second highly viscous fluid applied during the last n applications.

13. The method of claim 12, comprising determining a volume and an effective flow rate of the first highly viscous fluid and/or second highly viscous fluid extracted from the respective first pumping device and/or second pumping device as a function of the highly viscous fluid correction factor (FCF).

* * * * *